No. 784,049. Patented March 7, 1905.

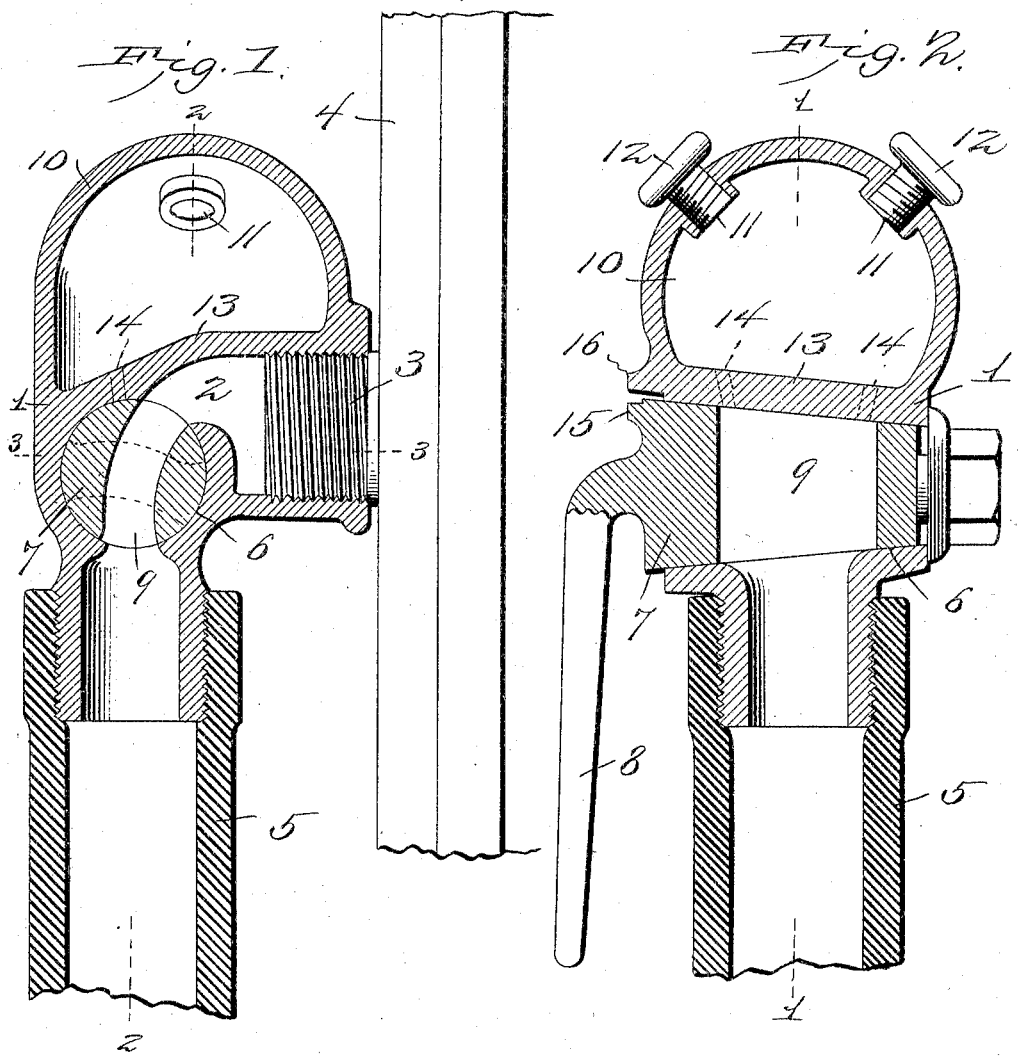

UNITED STATES PATENT OFFICE.

CHARLES HULTQUIST, OF DENVER, COLORADO.

COMBINED LUBRICATOR AND THROTTLE-VALVE.

SPECIFICATION forming part of Letters Patent No. 784,049, dated March 7, 1905.

Application filed May 23, 1904. Serial No. 209,402.

*To all whom it may concern:*

Be it known that I, CHARLES HULTQUIST, a citizen of the United States, residing at Denver, in the county of Denver and State of Colorado, have invented a new and useful Combined Lubricator and Throttle-Valve, of which the following is a specification.

My invention relates to a combined throttle-valve and lubricator designed especially for use in connection with rock-drilling machines, and has for its objects to produce a comparatively simple inexpensive device of this character in which the lubricant may be readily supplied to the machine from time to time as circumstances require and be controlled by the valve which controls the supply of steam or other fluid for driving the machine, the lubricant being fed into the latter through the medium of the fluid passing through the valve.

To these ends the invention comprises the novel features of construction and combination of parts more fully hereinafter described.

In the accompanying drawings, Figure 1 is a section through the valve embodying my invention, taken on the line 1 1 of Fig. 2. Fig. 2 is a section through the valve on the line 2 2 of Fig. 1. Fig. 3 is a section on the line 3 3 of Fig. 1 with the valve removed.

Referring to the drawings, 1 designates a valve-casing having a steam passage or duct 2 therethrough and coupled or connected at one end by a pipe 3 with the cylinder 4 of a drilling-machine and at the other end, by means of a hose 5 or the like, with an engine-boiler. (Not shown.) These parts, except as hereinafter explained, may be of the usual or any appropriate construction and material, inasmuch as they constitute no part of my invention.

Provided within the casing 1 and transversely of the duct 2, about midway between the end of the latter, is a valve opening or seat 6, having mounted for rotation therein a plug or throttle valve 7, provided at its outer end with an operating-handle 8 and between its ends with an opening or passage 9, adapted upon rotation of the valve to be moved into and out of register with the duct 2 for opening or closing the latter. The casing 1 has also formed therein an enlarged chamber or reservoir 10, designed in practice to receive a supply of lubricant, which may be introduced thereto through openings 11, normally closed by screw-plugs or other suitable closures 12, there being provided through the division-wall or partition 13 between the reservoir and duct 2 feed openings or passages 14, normally closed by the valve 7 and through which the oil may, when the valve is properly adjusted, escape from the reservoir into the duct 2.

In practice, supposing the valve to be adjusted to the position shown in Fig. 1, the steam or other fluid under pressure may pass from the source of supply through the duct 2 to the drilling-machine, attention being directed to the fact that under these conditions the valve 7 will serve to just close the passages 14 for cutting off supply of lubricant from the reservoir 10. When, however, it is necessary or desirable to feed lubricant to the cylinder of the drilling-machine, the valve may be slightly turned to permit the lubricant to escape from the reservoir through the passages 14 and into the duct 2, where it will be taken up and carried by the motive fluid into the cylinder 4, it being apparent that the valve may be moved sufficiently to open the passages 14 without affecting the passage of the fluid through the duct. When it is desired to cut off the supply of steam or fluid to the cylinder 4 for stopping the drill, the valve may, without opening the passages 14, be turned to the position indicated by dotted lines in Fig. 1 for closing the duct 2.

In order that the operator may readily determine the necessary movement of the valve for opening the passages 14, I provide a pair of pointers or indicators 15 16, preferably in the form of projections, as shown, formed, respectively, upon the valve and its casing. These projections are of a width equaling the amount of movement necessary for opening the passages and normally stand in alinement, it being obvious that when the valve is rotated in the proper direction until the pointers move out of alinement the passages will be opened.

From the foregoing it will be seen that I produce a device admirably adapted for the attainment of the ends in view, it being understood that minor changes in the details herein set forth may be resorted to without departing from the spirit of the invention.

Having thus described the invention, what is claimed is—

A valve-casing having a valved fluid-duct, an oil-chamber formed adjacent to said fluid-duct and separated from the latter by an apertured wall or web, and screw-closures engaging threaded perforations in the part of the casing which constitutes the oil-chamber; said valve being operable at will for opening the oil-passage without closing the fluid-duct, for opening the passage and closing the duct, or for closing both the passage and the duct.

In testimony that I claim the foregoing as my own I have hereto affixed my signature in the presence of two witnesses.

CHARLES HULTQUIST.

Witnesses:
 JOHN C. OCHES,
 ALFRED JOHNSON.